(12) United States Patent
Zhang et al.

(10) Patent No.: US 12,461,530 B2
(45) Date of Patent: Nov. 4, 2025

(54) PATH GENERATION METHOD FOR ROBOT, ROBOT AND COMPUTER-READABLE STORAGE MEDIUM

(71) Applicant: UBTECH ROBOTICS CORP LTD, Shenzhen (CN)

(72) Inventors: Zhihao Zhang, Shenzhen (CN); Yizhang Liu, Shenzhen (CN); Huan Tan, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 309 days.

(21) Appl. No.: 18/113,624

(22) Filed: Feb. 24, 2023

(65) Prior Publication Data

US 2023/0266764 A1 Aug. 24, 2023

(30) Foreign Application Priority Data

Feb. 24, 2022 (CN) .......................... 202210177948.9

(51) Int. Cl.
*G05D 1/00* (2024.01)
*G06T 7/73* (2017.01)

(52) U.S. Cl.
CPC ............. *G05D 1/0214* (2013.01); *G06T 7/75* (2017.01); *G06T 2200/04* (2013.01)

(58) Field of Classification Search
CPC .................................................... G05D 1/0214
See application file for complete search history.

(56) References Cited

U.S. PATENT DOCUMENTS

| | | | | |
|---|---|---|---|---|
| 4,663,726 A | * | 5/1987 | Chand | G05B 19/353 414/730 |
| 5,202,661 A | * | 4/1993 | Everett, Jr. | G05D 1/0255 340/565 |
| 6,068,073 A | * | 5/2000 | Roston | B62D 57/028 180/8.5 |
| 2008/0027590 A1 | * | 1/2008 | Phillips | G05D 1/0088 701/2 |
| 2016/0158936 A1 | * | 6/2016 | Moridaira | B25J 9/1666 700/255 |
| 2017/0057087 A1 | * | 3/2017 | Lee | G01C 21/3453 |
| 2018/0150082 A1 | * | 5/2018 | Jang | B60W 40/076 |
| 2020/0035073 A1 | * | 1/2020 | Cappello | G06F 3/014 |
| 2020/0318980 A1 | * | 10/2020 | Robinson | G01C 21/3446 |
| 2020/0340826 A1 | * | 10/2020 | Li | G01C 21/383 |
| 2021/0331315 A1 | * | 10/2021 | Park | B25J 9/1676 |

FOREIGN PATENT DOCUMENTS

| | | |
|---|---|---|
| CN | 103085070 A | 5/2013 |
| CN | 108196536 A | 6/2018 |
| CN | 112223291 A | 1/2021 |

* cited by examiner

*Primary Examiner* — Vivek D Koppikar
*Assistant Examiner* — Paul W Arellano

(57) ABSTRACT

A path generation method for a robot includes: based on a scene model of a current scene and a machine model corresponding to the robot, combined with multiple configurations of the robot, determining a plurality of initial points between a start point and an end point in the scene model; removing redundant points from the plurality of the initial points to obtain necessary points among the initial points; and connecting the necessary points to obtain a path between the start point and the end point.

12 Claims, 5 Drawing Sheets

PATH GENERATION METHOD FOR ROBOT, ROBOT AND COMPUTER-READABLE STORAGE MEDIUM

CROSS REFERENCE TO RELATED APPLICATIONS

This application claims priority to Chinese Patent Application No. CN 202210177948.9, filed Feb. 24, 2022, which is hereby incorporated by reference herein as if set forth in its entirety.

TECHNICAL FIELD

The present disclosure generally relates to robots, and particularly to a path generation method for a robot and a robot.

BACKGROUND

With the continuous evolution and development of robots, various types of robots have emerged to adapt to different scenarios. Among them, some robots do not need to plan a path, while some robots need to plan a path, and can perform operations after arriving at the destination along the planned path.

For different scenarios, different paths need to be set for the robot. In the process of setting the paths, a robot can complete the planning of the path according to the triggered operation and the received data.

However, in the process of setting the path of the robot, it needs to set different paths for each robot in combination with different scenarios, which causes a problem that the workload of setting the path is relatively heavy.

Therefore, there is a need to provide a path generation method for a robot to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
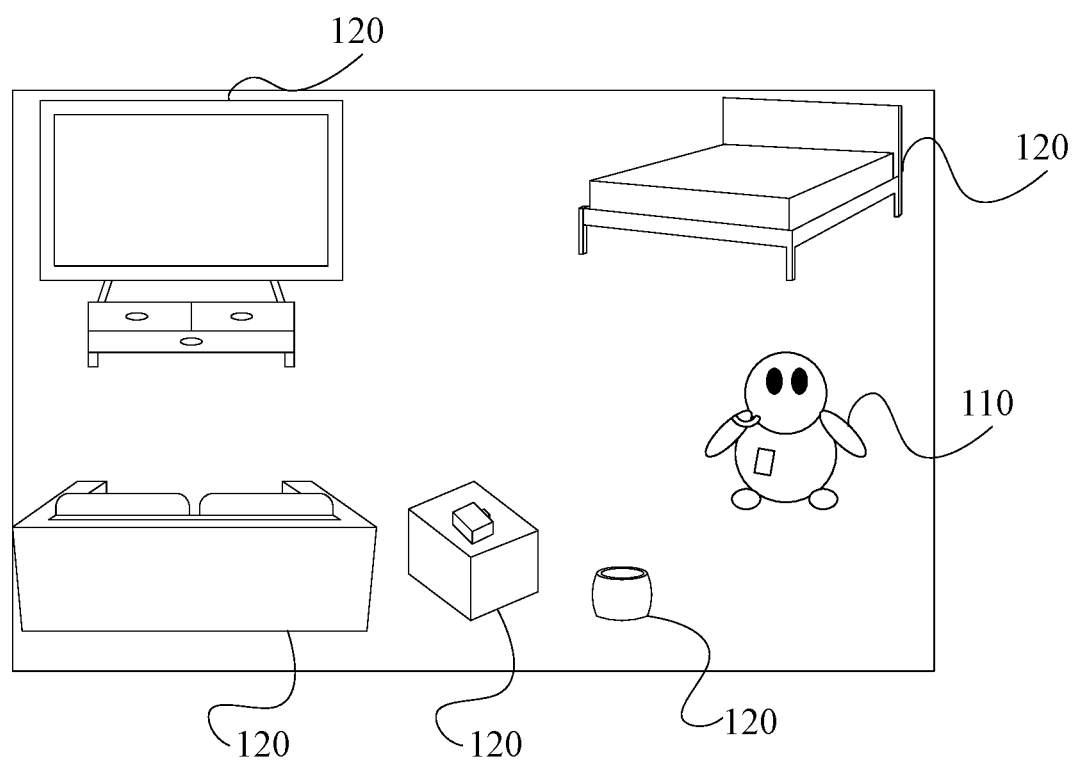
FIG. 1 is an exemplary schematic diagram of a path planning scenario.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 is a schematic diagram of a path planning scenario provided by an embodiment of the present application. As shown in FIG. 1, the path planning scenario may include a robot 110 and obstacles 120.

In one embodiment, the robot 110 can be a humanoid robot (e.g., a large humanoid biped robot)) and may include a head, a torso, two arms, two legs and two feet. The obstacles 120 may include objects such as tables, chairs, benches, refrigerators, and sofas, which are not limited here.

It should be noted that the robot provided in the embodiment of the present disclosure can be applied in various scenarios. The embodiment of this application does not limit the application scenarios of the robot. For the sake of simplicity, the embodiment of the present disclosure takes the indoor environment as an example of one scenario.

When the robot is in the indoor environment, it can first obtain one or more images of the current environment through the acquisition device of the robot, and perform scene voxelization on the current scene according to the acquired images to obtain the scene model corresponding to the current scene. Moreover, the robot can also establish a machine model corresponding to the robot according to preset parameters.

The robot can then determine each initial point of the robot moving from a start point to an end point in the scene model. Moreover, the robot can also identify multiple initial points, determine redundant points and necessary points among the initial points, thereby removing the redundant points and retaining the necessary points.

Finally, the robot can connect all necessary points to obtain the path of the robot to the end point and complete the trajectory planning.

In the process of determining the initial points, the robot can determine multiple initial points according to poses, configurations and configuration space of the robot, so as to ensure that the robot will not collide with obstacles in the current scene when it is moving to the end point.

It should be noted that, in the embodiment of the present disclosure, the poses of the robot may include the poses of the waist and arms of the robot, and the configurations of the robot may refer to the state of the robot. For example, the configurations can include the position of the robot in the scene, and the state of each part of the robot. The configuration space of the robot can include each configuration of the robot, which is a set of the configurations of the robot.

Figure 2:
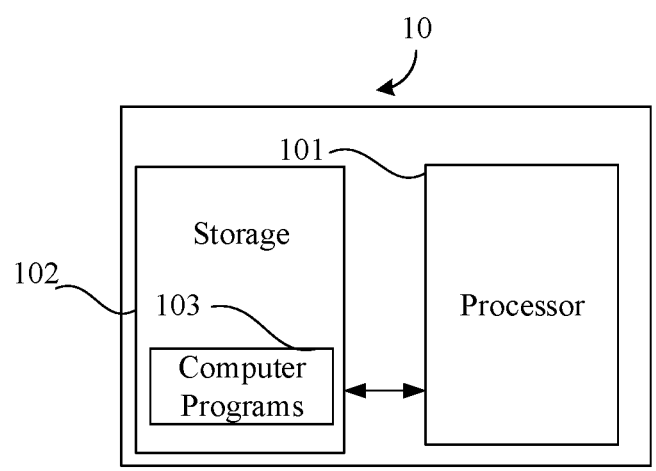
FIG. 2 is a schematic block diagram of a humanoid robot according to one embodiment.
Figure 3:
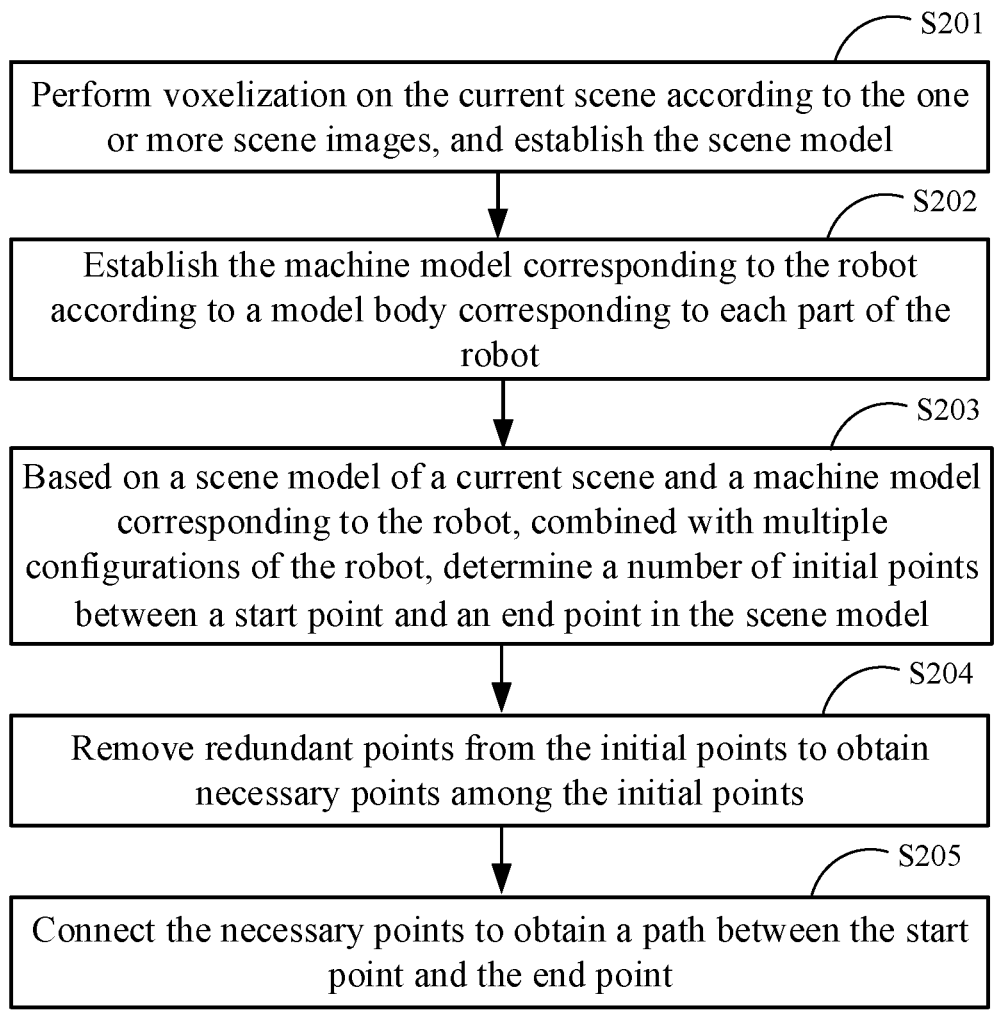
FIG. 3 is an exemplary flowchart of a path generation method according to one embodiment.
Figure 4:
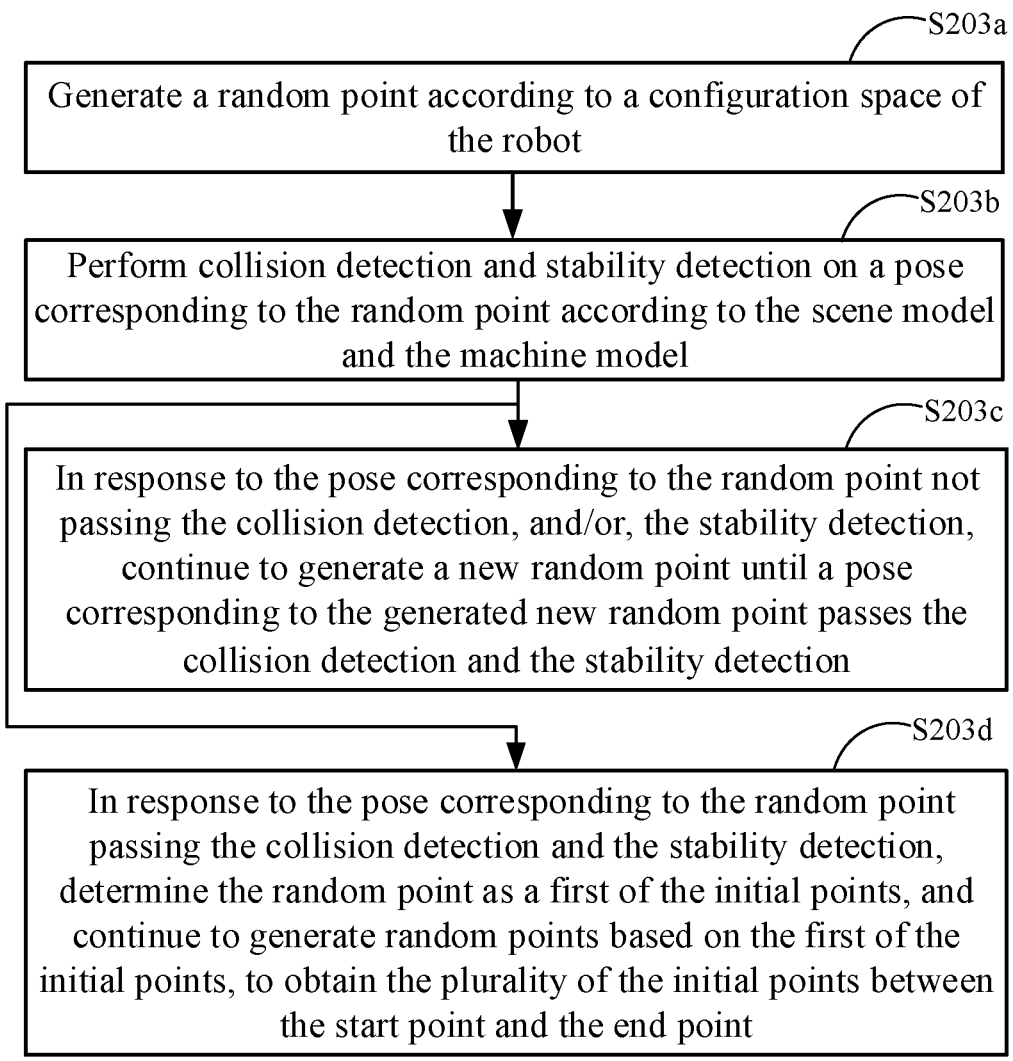
FIG. 4 is an exemplary flowchart of a method for determining initial points according to one embodiment.

FIG. 2 shows a schematic block diagram of the robot 110 according to one embodiment. The robot may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot, such as steps S201 to S205 in FIG. 3, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 5:
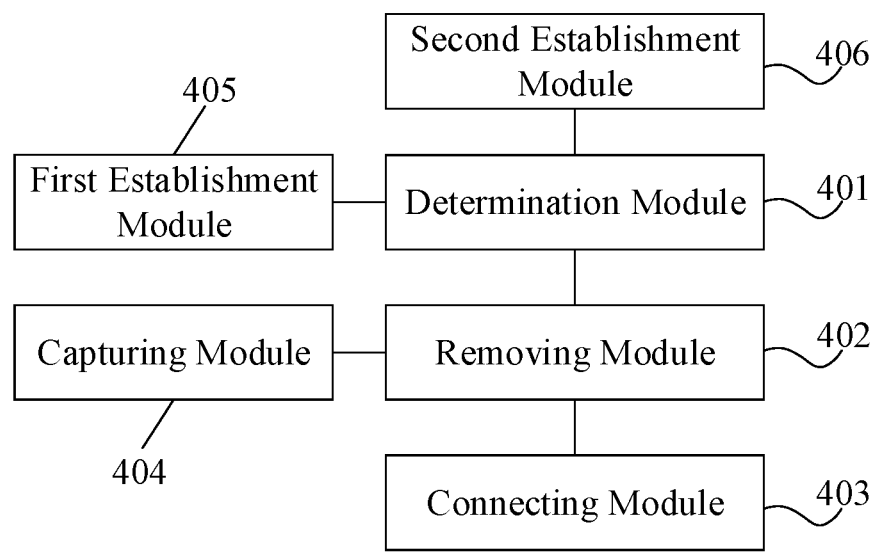
FIG. 5 is schematic block diagram of a path generation device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 103 may be divided into a determination module 401, a removing module 402 and a connecting module 403 as shown in FIG. 5.

It should be noted that the block diagram shown in FIG. 2 is only an example of the robot. The robot may include more or fewer components than what is shown in FIG. 2, or have a different configuration than what is shown in FIG. 2. Each component shown in FIG. 1 may be implemented in hardware, software, or a combination thereof.

The following describes the path generation method that enables the robot to achieve the goal of autonomously generating paths in indoor scenes.

FIG. 3 is a schematic flowchart of a path generation method according to one embodiment. As an example but not a limitation, the method can be applied to the robot in the above-mentioned path planning scenario. The method may include the following steps.

Step S201: Perform voxelization on the current scene according to the one or more scene images, and establish the scene model.

In the process of planning the path, the robot needs to model the current scene to obtain the scene model corresponding to the current scene, so that in the subsequent steps, the robot can perform collision detection according to the scene model to generate a path.

Specifically, the robot can capture images of the current scene through the equipped image capturing device, and obtain one or more scene images of the current scene. Then, according to each captured scene image, the current scene is voxelized to generate an envelope corresponding to each obstacle in the current scene, thereby establishing a scene model corresponding to the current scene.

The image capturing device equipped with the robot may be a binocular camera or an RGBD camera, which is not limited here.

Step S202: Establish the machine model corresponding to the robot according to a model body corresponding to each part of the robot.

Similar to step S201, before the robot generates a path, it needs to model the robot to obtain a machine model, so that collision detection can be performed according to the machine model and the scene model to determine whether the robot will collide with obstacles when it is moving.

Specifically, the robot can construct a robot envelope according to the model bodies corresponding to each part, thereby establishing a machine model. For example, cuboid model bodies can be used for the head and torso of the robot. Capsule-shaped model bodies can be used for the upper arms, forearms, thighs, and lower legs of the robot. In this way, the machine model for the robot can be obtained.

It should be noted that the embodiment of the present disclosure takes step S201 executed before step S202 as an example. However, in other embodiments, the robot can also first execute step S202 and then step S201, or it can also execute step S201 and step S201 simultaneously. The present disclosure does not limit the sequence of performing steps S201 and S202.

Step S203: Based on a scene model of a current scene and a machine model corresponding to the robot, combined with multiple configurations of the robot, determine a number of initial points between a start point and an end point in the scene model.

After the robot builds the scene model and machine model, it can generate a path to the end point according to the start point and end point in the scene, and the path generated by the robot is generated by connecting multiple points (i.e., waypoints).

Therefore, in the process of generating a path, the robot can first determine multiple initial points according to the start point and end point, combining the scene model, machine model and robot configurations, so that in the subsequent steps, the robot can generate a path based on multiple initial points.

Specifically, the robot can receive a triggered operation, and if the triggered operation instructs the robot to move towards the end point, the robot can determine the end point according to the operation. Then, the robot can determine the current position of the robot as the start point, and generate multiple initial points between the start point and the end point by combining the configuration space of the robot.

Referring to FIG. 3, in one embodiment, step S203 may include the following steps.

Step S203a: Generating a random point according to a configuration space of the robot.

The random point is corresponding to a random configuration that is randomly selected from the configuration space.

Specifically, after the robot determines the start point and the end point, it can randomly select a random configuration from the configuration space. Then, according to the configuration corresponding to the start point, that is, the current configuration of the robot, the robot can generate a new configuration that is consistent with or similar to the random configuration with a certain step length. Therefore, the position corresponding to the new configuration can be determined as a random point.

Similarly, the robot can determine multiple initial points during the path generation process. If the last initial point determined by the robot is the first initial point, the robot can, based on the first initial position, use a process similar to the above-mentioned process, continue to select a random configuration and determine a new configuration, so as to obtain the random point corresponding to the new configuration, that is, the second initial point.

For example, the configuration of the robot corresponding to the start point is $\xi_0$, and the configuration of the robot corresponding to the end point is $\xi_g$. In the process of generating the path, the configuration corresponding to the first initial point is $\xi_{near}$. The random configuration selected based on the start point or the first initial point is $\xi_{rand}$. The new configuration determined based on the random configuration is $\xi_{new}$, and the step length is $\varepsilon$.

Correspondingly, the robot can randomly select the random configuration $\xi_{rand}$ from the configuration space first, and based on the configuration $\xi_0$ corresponding to the start point, generate the new configuration $\xi_{new}$ that is the same as or similar to the random configuration $\xi_{rand}$ with a step size $\varepsilon$.

Further, the robot may determine the second initial point based on the first initial point. Specifically, the robot can randomly select another random configuration $\xi_{rand}$ from the configuration space, and based on the configuration $\xi_{near}$ corresponding to the first initial point, generate a new configurations $\xi_{new}$ that is the same as or similar to the random configuration $\xi_{rand}$ with a step length $\varepsilon$. Then, if the new configuration also passes the collision detection and stability detection in step S203b, the robot can use the position corresponding to the new configuration as the second initial point.

It should be noted that the above-mentioned process of determining a random position starts with the robot starting from the starting point. However, in practical applications, the robot can continue to generate random points after determining multiple initial points. If the robot has generated multiple random points, the robot can select the latest generated initial point, combined with the step length, to generate a new configuration that is consistent with or close to the random configuration.

In other embodiments, the robot can also use other approaches to generate a new configuration and determine a random point. The embodiment of the present disclosure does not limit the approaches for the robot to generate a new configuration and determine a random point.

Step S203b: Perform collision detection and stability detection on a pose corresponding to the random point according to the scene model and the machine model.

After determining a random point, the robot can obtain the pose corresponding to the random point according to the configuration corresponding to the random point. Therefore, the robot can perform collision detection the according to the pose and based on the scene model and the machine model to determine whether the robot will collide with an obstacle at the random point.

Moreover, the robot can also determine whether the robot can stand stably when it is in the pose according to the projection of the torso on the surface where the robot is currently standing, that is, determine the stability of the robot at the random point.

If it is determined that the robot will collide with an obstacle at the random point, and/or the robot is unstable at the random point, the robot can perform step S203c to continue to generate other random points, until a random point where the robot does not collide with obstacle and is stable is obtained.

If it is determined that the robot will not collide with an obstacle at the random point, and the robot is in a stable state at the random point, the robot can perform step 203d to retain the random point as the initial point, and continue to generate random points based on the initial point.

For example, the robot can determine the stability of the robot by perform calculation based on relative pose $_{base}^{tor-}{}_{so}T$ of the base frame of the robot's arms relative to the torso of the robot and the relative pose $_{torso}^{foot}T$ of the robot's waist relative to the feet of the robot. In one embodiment, the relative pose of the robot's waist relative to the feet can be calculated according to the equation as follows:

$$_{torso}^{foot}T = \begin{bmatrix} Rot_x(r_x)*Rot_y(r_y)Rot_z(r_z) & \begin{bmatrix} x & y & z \end{bmatrix}^T \\ 0 & 0 \end{bmatrix}.$$

Moreover, the robot can perform calculation according to the new configuration $\xi_{new}$ to obtain the pose of the arm end of the robot $\sigma_{new}=f(\xi_{new})$. Then, the pose of each link of the robot is obtained through the forward kinematics of the robotic arm, so as to obtain the pose of the robot. Finally, according to the obtained pose, combined with the scene model and the machine model, it can determine whether the robot will collide with the obstacles in the current scene, and the external collision detection can be completed.

In one embodiment, the forward kinematics of the robot can be established as follows: $\sigma=f(\xi)$. The end of each arm of the robot is referred to as "tool", and the relative pose from end of each arm of the robot to the torso can be obtained based on the forward kinematics of the arms. The relative poses in relation to the left arm and the right arm are referred to as $_{tool}^{base}T_{left}$ and $_{tool}^{base}T_{right}$. The poses of the ends of the arms of the robot can be expressed as follows:

$$f(\xi) = \begin{bmatrix} _{torso}^{foot}T * _{base}^{torso}T * _{tool}^{base}T_{left} \\ _{torso}^{foot}T * _{base}^{torso}T * _{tool}^{base}T_{right} \end{bmatrix}.$$

Similarly, the robot can also determine the links that the robot needs to perform collision detection according to the established self-collision index matrix, so as to realize the self-collision detection of the robot. Specifically, for the forearms of the robot, collision detection needs to be performed between the forearms and the head, torso, and thighs. For the upper arms of the robot, collision detection does not need to be performed between the upper arms and the torso.

The kinematics of the arms and waist of the robot is established as follows. The degree of freedom of the waist ($\xi$, 6 dimensions) and the degrees of freedom of the arms ($q_r$ and $q_l$, both 7 dimensions) form a 6+2*7-dimensional generalized coordinates of the whole body, namely $\xi=[\xi\ q_r q_l]$. The set formed by all the values of $\xi$ is the configuration space of the robot.

Step S203c: In response to the pose corresponding to the random point not passing the collision detection, and/or, the stability detection, continue to generate a new random point until a pose corresponding to the generated new random point passes the collision detection and the stability detection.

After it is determined that the random point generated by the robot fails the collision detection and stability detection, the robot can generate a random configuration again, and check whether the random point corresponding to the random configuration can pass the collision detection and stability detection until the generated random point can pass the collision detection and stability detection.

For the random point generated by the robot and the detection process, reference can be made to step S203a and step S203b, and will not be repeated here.

Step S203d: In response to the pose corresponding to the random point passing the collision detection and the stability detection, determine the random point as a first of the initial points, and continue to generate random points based on the first of the initial points, to obtain the plurality of the initial points between the start point and the end point.

The first initial point may be any one of the multiple initial points, which is not limited here.

After determining that the random point generated by the robot has passed the collision detection and stability detection, the robot may retain the random point as the first initial point. Then, the robot can continue to generate random points based on the first initial point, and repeat the steps S203a to S203b to obtain multiple initial points, thereby generating multiple initial points between the start point and the end point.

It should be noted that, in order to improve the efficiency of generating the initial points, the robot can use a bidirectional search approach to, based on the scene model of the current scene and the machine model corresponding to the robot, combined with the multiple configurations of the robot, determine multiple initial points between the start point and the end point in the scene model.

Specifically, the robot may first generate a random point based on the start point, and perform a detection on the random point. If the random point fails the detection, the robot can then generate a random point based on the end point and perform the detection. If the random point still does not pass the detection, the robot can generate a random point based on the start point again. If the random point generated this time passes the detection, the robot can retain the random point as the first initial point. Then, the robot can generate a random point based on the first initial point and repeat the process above until the minimum distance between each initial point extending from the start point and each initial point extending from the end point is smaller than a preset threshold, thereby completing generation of each initial point.

Step S204: Remove redundant points from the initial points to obtain necessary points among the initial points.

After the robot generates each initial point, it can further optimize each initial point to reduce the redundant paths between the start point and the end point, thereby improving the efficiency of the movement of the robot to the end point and reducing the distance of the movement of the robot.

In one embodiment, the robot can generate a direction vector according to the i-th initial point and the i+1-th initial point, control the collision model corresponding to the i-th initial point, and perform collision detection along the direction vector in the scene model, where i is an integer greater than or equal to 0 and less than N, and N is the number of generated initial points. The generated direction vector may point from the i-th initial point to the i+1-th initial point.

Specifically, the robot can establish a direction vector according to positions (such as coordinates in the scene model) corresponding to the i-th initial points and the i+1-th initial points. Then, the robot can generate a collision model based on the i-th initial point, and simulate the movement of the collision model along the direction vector to detect whether the collision model will collide with obstacles in the scene model.

The collision model is a simplified version of the machine model to allow rapid optimization of multiple initial points. For example, the collision model may be a cylinder, a cuboid or other models similar to a robot, which is not limited here.

If the collision model corresponding to the i-th initial point collides with an obstacle in the scene model, that is, a simulation result shows that the collision model obtained by the robot collides with an obstacle during the process of traveling from the i-th initial point to the i+1-th initial point, the robot can then determine that the i+1th initial point is a necessary point, not a redundant point, and thus retain the i+1th initial point.

If the collision model corresponding to the i-th initial point collides with an obstacle in the scene model, the robot can no longer perform a detection based on the i-th initial point, but determine that the i+2-th initial point is a necessary point or a redundant point based on the i+1-th initial point. The process of determining the i+2-th initial point as a necessary point or a redundant point is similar to the process of determining the i+1-th initial point as a necessary point or a redundant point, which will not be repeated here.

If the collision model corresponding to the i-th initial point does not collide with any obstacles after reaching the i+1-th initial point, that is, a simulation result shows that the collision model obtained by the robot does not collide with any obstacles during the process of travelling from the i-th initial point to the i+1-th initial point, the robot can then determine that the i+1th initial point is a redundant point, and remove the i+1-th initial point.

Moreover, the robot may continue to determine the i+2-th initial point as a necessary point or a redundant point based on the i-th initial point until the necessary points are determined.

Step S205: Connect the necessary points to obtain a path between the start point and the end point.

After optimizing multiple initial points and obtaining multiple necessary points, the robot can connect the multiple necessary points, so as to draw a path between the start point and the end point, so that the robot can move to the end point along the drawn path.

In one embodiment, the robot may draw a path based on the necessary points in various ways, which is not limited here. For example, the robot can use cubic spline interpolation or B-spline interpolation to connect the multiple necessary points to obtain the path between the start point and the end point.

In summary, by implementing the path generation method described above, a number of initial points between a start point and an end point in the scene model can be determined based on the scene model of the current scene and the machine model corresponding to the robot, combined with multiple configurations of the robot. One or more redundant points are then removed from the initial points to obtain necessary points among the initial points. The necessary points can then be connected to one another to obtain a path between the start point and the end point. The robot can independently determine multiple initial points according to the start point and the end point, optimize the initial points, and finally connects the optimized necessary points to one another to obtain the path for the robot to move from the start point to the end point. There is no need to set paths for each robot for each scene, which can solve the problem of heavy workload caused by setting paths for robots, and can improve the efficiency and flexibility of path generation for robots.

Based on the same inventive concept, an embodiment of the present disclosure provides a path generation device. The embodiment of the device corresponds to the foregoing method embodiment. For ease of reading, this embodiment of the device does not repeat the details of the aforementioned method embodiment one by one, but it should be clear that the device in this embodiment can correspondingly implement all the content of the aforementioned method embodiment.

Referring to FIG. 5, in one embodiment, the path generation device may include a determination module 401, a removing module 402 and a connecting module 403. The determination module 401 is to, based on a scene model of a current scene and a machine model corresponding to the robot, combined with multiple configurations of the robot, determine a number of initial points between a start point and an end point in the scene model. The removing module 402 is to remove redundant points from the plurality of the initial points to obtain necessary points among the initial points. The connecting module 403 is to connect the necessary points to obtain a path between the start point and the end point.

In one embodiment, the determination module 401 is to: generate a random point according to a configuration space of the robot, the random point corresponding to a random configuration that is randomly selected from the configuration space; perform collision detection and stability detection on a pose corresponding to the random point according to the scene model and the machine model; in response to the pose corresponding to the random point not passing the collision detection, and/or, the stability detection, continue to generate a new random point until a pose corresponding to the generated new random point passes the collision detection and the stability detection; and in response to the pose corresponding to the random point passing the collision detection and the stability detection, determine the random point as a first of the initial points, and continue to generate random points based on the first of the initial points, to obtain the plurality of the initial points between the start point and the end point.

In one embodiment, the determination module 401 is to: select randomly the random configuration from the configuration space of the robot; determine a new configuration based on a determined previous initial point in combination with a preset step length, the new configuration being the same as or similar to the random configuration; and determine a point corresponding to the new configuration as the random point.

In one embodiment, the determination module 401 is to: based on the scene model of the current scene and the machine model corresponding to the robot, combined with multiple configurations of the robot, determine the multiple initial points between the start point and the end point in the scene model using bidirectional search.

In one embodiment, the removing module 402 is to: generate a direction vector that points from an i-th initial point to an i+1-th initial point; control a collision model corresponding to the i-th initial point, and perform collision detection along the direction vector in the scene model; in response to the collision model corresponding to the i-th initial point colliding with an obstacle in the scene model, determine the i+1-th initial point as one of the necessary points, and determine an i+2-th initial point as another one of the necessary points or one of the redundant points based on the i+1-th initial point; and in response to the collision model corresponding to the i-th initial point not colliding with any obstacles in the scene model, determine the i+1-th initial point as one of the redundant points, remove the i+1-th initial point, and determine an i+2-th initial point as one of the necessary points or one of the redundant points until the necessary points are determined.

In one embodiment, the connecting module 403 is to connect the necessary points by using cubic spline interpolation or B-spline interpolation to obtain the path between the start point and the end point.

In one embodiment, the device may further include a capturing module 404, a first establishment module 405 and a second establishment module 406. The capturing module 404 is to obtain one or more scene images of the current scene. The first establishment module 405 is to perform voxelization on the current scene according to the one or more scene images, and establish the scene model. The second establishment module 406 is to establish the machine model corresponding to the robot according to a model body corresponding to each part of the robot.

In summary, with the configuration of the device described above, a number of initial points between a start point and an end point in the scene model can be determined based on the scene model of the current scene and the machine model corresponding to the robot, combined with multiple configurations of the robot. One or more redundant points are then removed from the initial points to obtain necessary points among the initial points. The necessary points can then be connected to one another to obtain a path between the start point and the end point. The robot can independently determine multiple initial points according to the start point and the end point, optimize the initial points, and finally connects the optimized necessary points to one another to obtain the path for the robot to move from the start point to the end point. There is no need to set paths for each robot for each scene, which can solve the problem of heavy workload caused by setting paths for robots, and can improve the efficiency and flexibility of path generation for robots.

It should be noted that the basic principles and technical effects of the path generation device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. In addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM); a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented path generation method for a robot, the method comprising:
    based on a scene model of a current scene and a machine model corresponding to the robot, combined with multiple configurations of the robot, determining a plurality of initial points between a start point and an end point in the scene model, wherein each configuration of the robot comprises: a position of the robot in the current scene, and a state of each part of the robot;
    removing redundant points from the plurality of the initial points to obtain necessary points among the initial points; and
    connecting the necessary points to obtain a path between the start point and the end point;
    wherein the method further comprises, before determining the plurality of initial points between the start point and the end point in the scene model,
    obtaining one or more scene images of the current scene;
    performing voxelization on the current scene according to the one or more scene images, generating an envelope corresponding to each obstacle in the current scene, and establishing the scene model corresponding to the current scene;
    constructing a robot envelope according to model bodies corresponding to each part of the robot, and establishing the machine model corresponding to the robot according to the robot envelope.

2. The method of claim 1, wherein the robot is a humanoid robot, and determining the plurality of the initial points between the start point and the end point in the scene model comprises:
    generating a random point according to a configuration space of the robot, the random point corresponding to a random configuration that is randomly selected from the configuration space;
    performing collision detection and stability detection on a pose corresponding to the random point according to the scene model and the machine model, wherein the stability detection comprises: determining the stability of the robot by performing calculation based on a relative pose of a base frame of arms of the robot relative to a torso of the robot and a relative pose of a waist of the robot relative to feet of the robot;
    in response to the pose corresponding to the random point not passing the collision detection, and/or, the stability detection, continuing to generate a new random point until a pose corresponding to the generated new random point passes the collision detection and the stability detection; and
    in response to the pose corresponding to the random point passing the collision detection and the stability detection, determining the random point as a first of the initial points, and continuing to generate random points based on the first of the initial points, to obtain the plurality of the initial points between the start point and the end point.

3. The method of claim 2, wherein determining the plurality of the initial points between the start point and the end point in the scene model comprises:
    based on the scene model of the current scene and the machine model corresponding to the robot, combined with multiple configurations of the robot, determining the multiple initial points between the start point and the end point in the scene model using bidirectional search.

4. The method of claim 1, wherein connecting the necessary points to obtain the path between the start point and the end point comprises:
    connecting the necessary points by using cubic spline interpolation or B-spline interpolation to obtain the path between the start point and the end point.

5. A robot comprising:
    one or more processors; and
    a memory coupled to the one or more processors, the memory storing programs that, when executed by the one or more processors, cause performance of operations comprising:
    based on a scene model of a current scene and a machine model corresponding to the robot, combined with multiple configurations of the robot, determining a plurality of initial points between a start point and an end point in the scene model, wherein each configuration of the robot comprises: a position of the robot in the current scene, and a state of each part of the robot;
    removing redundant points from the plurality of the initial points to obtain necessary points among the initial points; and
    connecting the necessary points to obtain a path between the start point and the end point;
    wherein the operations further comprise, before determining the plurality of initial points between the start point and the end point in the scene model,
    obtaining one or more scene images of the current scene;
    performing voxelization on the current scene according to the one or more scene images, generating an envelope corresponding to each obstacle in the current scene, and establishing the scene model corresponding to the current scene;
    constructing a robot envelope according to model bodies corresponding to each part of the robot, and establishing the machine model corresponding to the robot according to the robot envelope.

6. The robot of claim 5, wherein determining the plurality of the initial points between the start point and the end point in the scene model comprises:

generating a random point according to a configuration space of the robot, the random point corresponding to a random configuration that is randomly selected from the configuration space;

performing collision detection and stability detection on a pose corresponding to the random point according to the scene model and the machine model;

in response to the pose corresponding to the random point not passing the collision detection, and/or, the stability detection, continuing to generate a new random point until a pose corresponding to the generated new random point passes the collision detection and the stability detection; and in response to the pose corresponding to the random point passing the collision detection and the stability detection, determining the random point as a first of the initial points, and continuing to generate random points based on the first of the initial points, to obtain the plurality of the initial points between the start point and the end point.

7. The robot of claim 6, wherein determining the plurality of the initial points between the start point and the end point in the scene model comprises:

based on the scene model of the current scene and the machine model corresponding to the robot, combined with multiple configurations of the robot, determining the multiple initial points between the start point and the end point in the scene model using bidirectional search.

8. The robot of claim 5, wherein connecting the necessary points to obtain the path between the start point and the end point comprises:

connecting the necessary points by using cubic spline interpolation or B-spline interpolation to obtain the path between the start point and the end point.

9. A non-transitory computer-readable storage medium storing instructions that, when executed by at least one processor of a robot, cause the at least one processor to perform a method, the method comprising:

based on a scene model of a current scene and a machine model corresponding to the robot, combined with multiple configurations of the robot, determining a plurality of initial points between a start point and an end point in the scene model, wherein each configuration of the robot comprises: a position of the robot in the current scene, and a state of each part of the robot;

removing redundant points from the plurality of the initial points to obtain necessary points among the initial points; and connecting the necessary points to obtain a path between the start point and the end point:

wherein the method further comprises, before determining the plurality of initial points between the start point and the end point in the scene model, obtaining one or more scene images of the current scene;

performing voxelization on the current scene according to the one or more scene images, generating an envelope corresponding to each obstacle in the current scene, and establishing the scene model corresponding to the current scene;

constructing a robot envelope according to model bodies corresponding to each part of the robot, and establishing the machine model corresponding to the robot according to the robot envelope.

10. The non-transitory computer-readable storage medium of claim 9, wherein determining the plurality of the initial points between the start point and the end point in the scene model comprises:

generating a random point according to a configuration space of the robot, the random point corresponding to a random configuration that is randomly selected from the configuration space;

performing collision detection and stability detection on a pose corresponding to the random point according to the scene model and the machine model;

in response to the pose corresponding to the random point not passing the collision detection, and/or, the stability detection, continuing to generate a new random point until a pose corresponding to the generated new random point passes the collision detection and the stability detection; and in response to the pose corresponding to the random point passing the collision detection and the stability detection, determining the random point as a first of the initial points, and continuing to generate random points based on the first of the initial points, to obtain the plurality of the initial points between the start point and the end point.

11. The non-transitory computer-readable storage medium of claim 10, wherein determining the plurality of the initial points between the start point and the end point in the scene model comprises:

based on the scene model of the current scene and the machine model corresponding to the robot, combined with multiple configurations of the robot, determining the multiple initial points between the start point and the end point in the scene model using bidirectional search.

12. The non-transitory computer-readable storage medium of claim 9, wherein connecting the necessary points to obtain the path between the start point and the end point comprises:

connecting the necessary points by using cubic spline interpolation or B-spline interpolation to obtain the path between the start point and the end point.

* * * * *